G. B. COCAYNE.
LEVEL.
APPLICATION FILED JULY 22, 1921.
1,430,535. Patented Oct. 3, 1922.
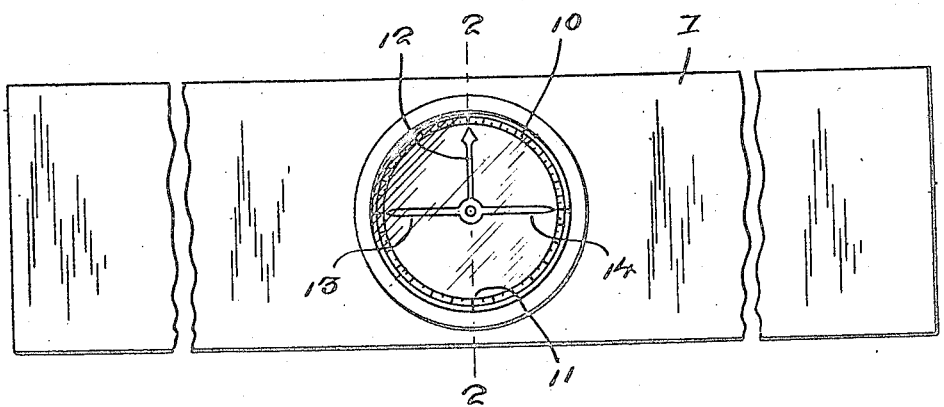
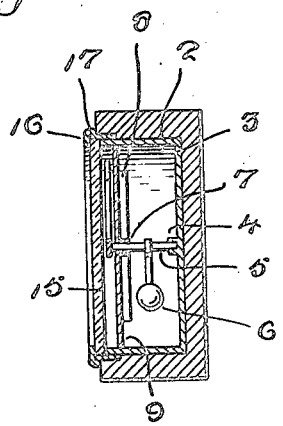 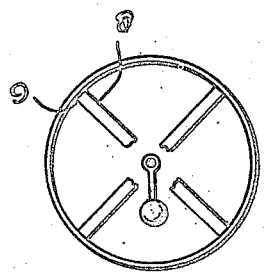
Witnesses:—
Inventor
GEORGE B COCAYNE
Attorney Patented Oct. 3, 1922.

1,430,535

UNITED STATES PATENT OFFICE.

GEORGE B. COCAYNE, OF SIOUX CITY, IOWA.

LEVEL.

Application filed July 22, 1921. Serial No. 486,679.

*To all whom it may concern:*

Be it known that I, GEORGE B. COCAYNE, a citizen of the United States, residing at Sioux City, in the county of Woodbury and State of Iowa, have invented new and useful Improvements in Levels, of which the following is a specification.

The object of my present invention is the provision of a level in which a plumb bob is employed to move pointers for indicating the degrees of angularity from the perpendicular and the horizontal, the said level being simple and inexpensive in construction and at the same time well adapted to withstand the rough usage to which appliances handled by mechanics are ordinarily subjected.

To the attainment of the foregoing, the invention consists in the improvement as hereinafter described and definitely claimed.

In the accompanying drawings, forming part of this specification :—

Figure 1 is a side elevation of my novel level, with the body of the level broken.

Figure 2 is a transverse section taken in the plane indicated by the line 2—2 of Figure 1.

Figure 3 is a detail broken view illustrative of the relative arrangement of the casing body, the spider, and the shaft one end portion of which is journaled in the spider.

Similar numerals of reference designate corresponding parts in all of the views of the drawings.

The body 1 of my novel level may be and preferably is of wood, and in one of its sides and at an intermediate point in its length it is chambered as indicated by 2 in Figure 2. In the said chamber 2 is arranged a casing body 3 which is preferably of metal and has its edge arranged approximately flush with the chambered side of the body 1. At the center of its inner wall the casing body 3 is provided with a bearing 4 to receive one end of a shaft 5 on which is a plumb bob 6. The outer portion of the said shaft 5 is journaled in the center 7 of a spider 8 the arms of which are fixed at 9 with respect to the circular wall of the casing body 3.

Arranged in the casing body 3 and snug against the spider 8 so as to be supported by the spider 8 is a dial 9 on the face of which are preferably, though not necessarily, employed graduations 10, arranged in a circular series or in arcuate sets as desired. I also prefer to provide the dial on its face with marks 11, Figure 1, arranged equi-distantly as illustrated. Fixed on the shaft 5 in front of the dial 9 are pointers 12, 13 and 14, the pointer 12 being designed to indicate the variations from the vertical or perpendicular, and the pointers 13 and 14 to indicate the variations from the horizontal.

Arranged in front of the pointers is a transparent disk 15 preferably of glass which is retained within the flange 16 of an annulus 17, appropriately secured on the circular wall of the casing body 3. It will be apparent from the foregoing that my novel level is calculated to accurately indicate variations from the vertical and from the horizontal of any piece of structure on which the body 1 is arranged edgewise; and it will also be apparent that the level as a whole is simple and inexpensive in construction and is not liable to get out of order even when roughly or carelessly handled.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is :—

A level comprising a body having a circular chamber in one of its sides, a casing body snugly occupying said chamber and having a central bearing on its inner wall and in its interior, a spider fixed in the casing body, a shaft journaled in the said bearing on the inner wall of the casing body and in the spider and extending outwardly beyond the latter, a dial snugly arranged in the casing body about the shaft and immediately against the outer side of the spider whereby the dial is braced by the spider, pointing means fixed to the shaft and arranged in front of the dial, a transparent disk opposed to the edge of the casing body, an annulus having a flange spaced from said edge and opposed to the outer side of the said disk and also having a flange interposed between the body and the casing body and surrounding the latter whereby the annulus is secured in position, and a plumb bob fixed to the shaft and arranged between the inner wall of the casing body and the spider.

In testimony whereof, I affix my signature.

GEO. B. COCAYNE.